US012795727B2

(12) United States Patent
Pettersson et al.

(10) Patent No.: US 12,795,727 B2
(45) Date of Patent: Nov. 10, 2026

(54) USAGE OF CSR RESOURCES BY NON-PARTICIPATING WIRELESS STATION

(71) Applicant: Telefonaktiebolaget LM Ericsson (publ), Stockholm (SE)

(72) Inventors: Charlie Pettersson, Solna (SE); Jonas Sedin, Brentford (GB); Sebastian Max, Cologne (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 373 days.

(21) Appl. No.: 18/569,267

(22) PCT Filed: Jun. 25, 2021

(86) PCT No.: PCT/EP2021/067515

§ 371 (c)(1),
(2) Date: Dec. 12, 2023

(87) PCT Pub. No.: WO2022/268338

PCT Pub. Date: Dec. 29, 2022

(65) Prior Publication Data

US 2024/0284507 A1 Aug. 22, 2024

(51) Int. Cl.

*H04W 74/0816* (2024.01)
*H04W 24/08* (2009.01)
*H04W 84/12* (2009.01)

(52) U.S. Cl.

CPC ....... *H04W 74/0816* (2013.01); *H04W 24/08* (2013.01); *H04W 84/12* (2013.01)

(58) Field of Classification Search

CPC . H04W 74/0816; H04W 24/08; H04W 84/12; H04W 74/002; H04B 7/024
See application file for complete search history.

(56) References Cited

U.S. PATENT DOCUMENTS

2017/0078887 A1* 3/2017 Barriac ................ H04B 17/382
2019/0045461 A1* 2/2019 Fang .................. H04W 52/367
2020/0106579 A1 4/2020 Cherian et al.
2020/0274659 A1 8/2020 Ouchi
2021/0120427 A1 4/2021 Wang et al.

OTHER PUBLICATIONS

"Coordinated AP Time/Frequency Sharing in a Transmit Opportunity in 11be", IEEE 802.11-19/1582r1, Nov. 2019, 16 pages.
"Part 11: Wireless LAN Medium Access Control (MAC) and Physical Layer (PHY) Specifications", IEEE Std 802.11-2016 (Revision of IEEE Std 802.11-2012), 2016, 3534 pages.

(Continued)

*Primary Examiner* — Sun Jong Kim
(74) *Attorney, Agent, or Firm* — Murphy, Bilak & Homiller, PLLC

(57) ABSTRACT

At least one resource may be shared through coordinated spatial reuse among multiple access points. A wireless station that is not participating in the coordinated spatial reuse may receive signaling exchanged between the participating access points for coordinating reuse of the at least one resource. The signaling may indicate one or more conditions or limitations applicable to autonomous spatial reuse of the at least one resource by the wireless station.

20 Claims, 8 Drawing Sheets

(56) References Cited

OTHER PUBLICATIONS

"Standard for Information technology—Telecommunications and information exchange between systems Local and metropolitan area networks—Specific requirements—Part 11: Wireless LAN Medium Access Control (MAC) and Physical Layer (PHY) Specifications", 802.11-2016 [P802.11be], 2016, 2 pages.
802.11 Working Group of the LAN/ , "IEEE P802.11ax™M/D6.0", Draft Standard for Information technology—Telecommunications and information exchange between systems Local and metropolitan area networks—Specific requirements, Part 11: Wireless LAN Medium Access Control (MAC) and Physical Layer (PHY) Specifications, Nov. 2019, 1-780.
Han, Jonghun , et al., "Coordinated Spatial Reuse: Extension to Uplink", IEEE 802.11-20/1040r2, Jul. 2020, 18 pages.
Seok, Yongho , et al., "Coordinated Spatial Reuse Protocol", doc.: IEEE 802.11-20/0576r0, Apr. 2020, 20 pages.

* cited by examiner

USAGE OF CSR RESOURCES BY NON-PARTICIPATING WIRELESS STATION

TECHNICAL FIELD

The present invention relates to methods for controlling wireless transmissions and to corresponding devices, systems, and computer programs.

BACKGROUND

In wireless communication technologies, there is an increased interest in using unlicensed bands, like the 2.4 GHZ ISM (Industrial Scientific and Medical) band, the 5 GHz band, the 6 GHz band, and the 60 GHz band using more advanced channel access technologies. Historically, Wi-Fi has been the dominant standard in unlicensed bands when it comes to applications requiring support for high data rates. The Wi-Fi technology is for example specified in IEEE Standard for Information technology-Telecommunications and information exchange between systems Local and metropolitan area networks-Specific requirements—Part 11: Wireless LAN Medium Access Control (MAC) and Physical Layer (PHY) Specifications," in IEEE Std 802.11-2016 (Revision of IEEE Std 802.11-2012), vol., no., pp. 1-3534, 14 Dec. 2016, in the following denoted as "IEEE 802.11 Specifications".

In the IEEE 802.11 Specifications, stations (STAs) are classified as access points (APs) and non-access point stations (non-AP STAs). For ease of notation, and following common usage, the term STA is often used to denote a non-AP STA.

Currently, an amendment to the IEEE 802.11 Specifications is being developed which focuses on extremely high throughput (EHT), denoted as IEEE 802.11be amendment. A candidate feature expected to be introduced in the IEEE 802.11 amendment is multi-AP coordination.

For example, "Coordinated AP Time/Frequency Sharing in a Transmit Opportunity in 11be", Internet document IEEE 802.11-19/1582r1 (URL: "https://mentor.ieee.org/802.11/dcn/19/11-19-1582-01-00be-coordinated-ap-time-and-frequency-sharing-in-a-transmit-opportunity-in-11be.pptx", November 2019) proposes a time/frequency resource sharing mechanism in which multiple APs belonging to the same Extended Service Set (ESS) can coordinate and share among themselves their time/frequency resources within a TXOP (Transmit Opportunity). The proposed mechanism may consist of multiple phases. In a setup phase an AP that has gained a TXOP, also denoted as the TXOP owner, may indicate to other APs that it is willing to share the TXOP, e.g., by sending a TX indication frame, and one or more neighboring APs indicate their intention to participate in sharing the resources, e.g. by sending a request frame. The TXOP owner may also be referred to as "Sharing AP", and the participating AP(s) may also be referred to as "Shared AP(s)". Further, the TXOP owner may inform the participating APs about their allocated resources and a transmit (TX) start time, and the participating APs may inform their client STAs about their respective resource allocations. In a subsequent phase the participating APs transmit on their respective allocated resources in the TXOP, beginning at the TX start time.

The sharing of the TXOP during the transmission of data in the third phase can be based on multiplexing in the time domain, e.g., TDMA (Time Division Multiple Access), multiplexing in the frequency domain, e.g., OFDMA, or multiplexing in the spatial domain, e.g., using MU-MIMO (Multi-User Multiple Input/Multiple Output).

Further, the sharing of the TXOP can be based on spatial reuse, which is also referred to as coordinated spatial reuse (CSR). In such variants, the resources of the TXOP can be used simultaneously, sometimes in combination with transmit power control, and multiplexing of the resources of the TXOP is not required. CSR-based operation is for example described in "Coordinated Spatial Reuse: Extension to Uplink", Internet document IEEE 802.11-20/1040r2 (URL: https://mentor.ieee.org/802.11/dcn/20/11-20-1040-02-00be-coordinated-sr-for-uplink.pptx, July 2020).

CSR is a transmission scheme that tries to improve the spatial efficiency in a network consisting of more than one AP. Contrary to coordinated beamforming which aims to increase spatial efficiency by nulling towards other devices, CSR uses the same frequency and time resources for all transmission but with coordinated power control between the APs such that the interference levels are tolerable at the different receivers of each basic service set (BSS).

The APs and STAs that participate in the CSR have different roles:

- The "Sharing" AP is the AP that wins the contention for the channel and thus owns the TXOP. It starts the CSR operation by coordinating with the other APs.
- The one or more "Shared" AP(s) react to the invitation by the Sharing AP to participate in the CSR.
- The STAs associated with the Sharing AP react to the scheduling instructions by the Sharing AP.
- The STAs associated with each Shared AP react to the scheduling instructions by the respective Shared AP, possibly taking into account special parameters for their transmissions that are required to enable efficient channel reuse and are provided by the sharing AP.

The IEEE 802.11ax technology introduces Orthogonal Frequency-Division Multiple Access (OFDMA) as a new option to access the channel, see IEEE P802.11ax™M/D6.0 Draft Standard for Information technology—Tele-communications and information exchange between systems Local and metropolitan area networks—Specific requirements Part 11: Wireless LAN Medium Access Control (MAC) and Physical Layer (PHY) Specifications Amendment 1: Enhancements for High Efficiency WLAN (November 2019), in the following denoted as "IEEE 802.11ax Draft". In contrast to the legacy medium access function of the IEEE 802.11 Specifications, where each STA decides by itself when to start the contention for the channel access, the OFDMA transmissions of the IEEE 802.11ax technology are centrally controlled by the AP:

- For downlink (DL) traffic from the AP to the STAs, the AP schedules the DL transmissions into different, frequency-separated resource units (RUs) and transmits them using one multi-user OFDMA frame to the associated STAs in parallel.
- For uplink (UL) traffic from the STAs to the AP, the AP first sends a trigger frame (TF) that indicates the scheduled STAs of the following multi-user uplink OFDMA transmission, together with their transmission parameters like RU, duration, MCS (Modulation and Coding Scheme). After the reception of the TF, the STAs reply with a special Trigger-based (TB) PPDU (Physical Protocol Data Unit) that uses only the RU indicated by the AP in the TF.

The TF includes fields that allow the AP to control targeted receive power of the following TB-PPDU, such that the STAs adapt their transmission power with the intent that the received power level in each RU is the same.

The IEEE 802.11ax technology also includes features aiming at addressing increased spatial reuse of resources. Specifically, the IEEE 802.11ax technology supports two different flavors of spatial reuse: OBSS PD-based (Overlapping BSS Preamble Detection based) spatial reuse and PSR (Parametrized Spatial reuse).

In OBSS PD-based spatial reuse, when performing LBT (Listen Before Talk) to gain channel access, the STA is allowed to ignore certain inter-BSS PPDUs under certain conditions and then transmit concurrently with controlled transmit power. The PPDU that is to be ignored can either be identified as a Spatial Reuse Group (SRG) PPDU or a non-SRG PPDU. The STA recognizes that a PPDU is an SRG PPDU if the BSS color in the PPDU matches one of the BSS colors that have been configured by the associated AP.

For a recognized SRG PPDU, the STA may disregard the PPDU if the following conditions are true:

- The signal strength is below the configured SRG OBSS PD level.
- The PPDU does not contain a frame addressed to the STA and does not carry an NDP or an NDP announcement frame.

For a detected non-SRG PPDU, operating with a non-SRG OBSS PD level, the conditions for ignoring the PPDU are stricter, requiring for instance that

- non-SRG OBSS PD-based spatial reuse is enabled by the associated AP,
- the received PPDU is not a CTS or a response frame such as a block acknowledgement,
- a field in the received PDDU, denoted as "HE-SIG-A" (High Efficiency Signal A) does not explicitly disallow spatial reuse, and
- the signal strength is below the non-SRG OBSS PD level.

In OBSS PD-based spatial reuse, the STA controls its transmit power in a trade-off fashion: The STA is allowed to ignore the inter-BSS PDU during its LBT procedure in exchange for reducing its own transmit power. The amount of reduction is proportional to the received signal strength of the inter-BSS PDU. Thus, the STA is likely forced to adapt the MCS to a more robust rate. If the inter-BSS PDU is received with a low power, the used transmit power can be higher, allowing for higher MCS but likely less opportunities of spatially reuse.

PSR operation is specialized for the case of inter-BS HE (High Efficiency) TB-PPDU transmissions: The STA is allowed to ignore inter-BSS PPDUs if it detects a HE TB-PPDU or a TF with a field denoted as "SPATIAL_REUSE" being set and if it controls its transmit power during the PPDU duration. The control of the transmit power is done based on an indication of the maximum allowed interference power that the potential victim can accept. This interference power level is signaled in either the TF or the HE TB-PPDU. The use of PSR can be controlled through the use of a field denoted as "PSR_DISALLOW" in the HE-SIG-A field. By setting the HE-SIG-A field, another AP or STA can thus decide whether PSR is allowed or not.

CSR has several benefits over the spatial reuse supported by the IEEE 802.11ax technology, such as increased system throughput due to more tight coordination. CRS is however controlled by the AP and thus requires some preparation before an UL CSR transmission can begin. Such preparation may for example include that the involved APs acquire the buffer status reports from the associated STAs and determine which STAs should be served in the TXOP. On the other hand, a more autonomous spatial reuse as supported by the IEEE 802.11ax technology is typically simpler since it is the STA that determines whether it is allowed to transmit or not, which may for example provide latency benefits.

Accordingly, there is a need for techniques which allow for improved utilization of CSR.

SUMMARY

According to an embodiment, a method of controlling wireless transmissions in a wireless communication system is provided. According to the method, a wireless station receives, from an AP of the wireless communication system, a message for coordinating spatial reuse based sharing of at least one resource by the AP and one or more further APs. Based on the received message, the wireless station controls spatial reuse of the at least one resource by the wireless station.

According to a further embodiment, a method of controlling wireless transmissions in a wireless communication system is provided. According to the method, an AP of the wireless communication system coordinates, with one or more further APs, spatial reuse based sharing of at least one resource. Further, the AP determines whether a wireless station not participating in the coordinated spatial reuse based sharing of the at least one resource is allowed to transmit on the at least one resource and provides, to the wireless station, an indication that the wireless station is allowed to transmit on the at least one resource.

According to a further embodiment, a wireless station for a wireless communication system is provided. The wireless station is configured to receive, from an AP of the wireless communication system, a message for coordinating spatial reuse based sharing of at least one resource by the AP and one or more further APs. Further, the wireless station is configured to control, based on the received message, spatial reuse of the at least one resource by the wireless station.

According to a further embodiment, a wireless station for a wireless communication system is provided. The wireless station comprises at least one processor and a memory. The memory contains instructions executable by said at least one processor, whereby the wireless station is operative to receive, from an AP of the wireless communication system, a message for coordinating spatial reuse based sharing of at least one resource by the AP and one or more further APs. Further, the memory contains instructions executable by said at least one processor, whereby the wireless station is operative to control, based on the received message, spatial reuse of the at least one resource by the wireless station.

According to a further embodiment, an AP for a wireless communication system is provided. The AP is configured to coordinate, with one or more further APs, spatial reuse based sharing of at least one resource. Further, the AP is configured to determine whether a wireless station not participating in the coordinated spatial reuse based sharing of the at least one resource is allowed to transmit on the at least one resource and provide, to the wireless station, an indication that the wireless station is allowed to transmit on the at least one resource.

According to a further embodiment, an AP for a wireless communication system is provided. The AP comprises at least one processor and a memory. The memory contains instructions executable by said at least one processor, whereby the AP is operative to coordinate, with one or more further APs, spatial reuse based sharing of at least one resource. Further, the memory contains instructions executable by said at least one processor, whereby the AP is operative to determine whether a wireless station not participating in the coordinated spatial reuse based sharing of the at least one resource is allowed to transmit on the at least one resource and provide, to the wireless station, an indication that the wireless station is allowed to transmit on the at least one resource.

According to a further embodiment, a computer program or computer program product is provided, e.g., in the form of a non-transitory storage medium, which comprises program code to be executed by at least one processor of an wireless station for a wireless communication system. Execution of the program code causes the wireless station to receive, from an AP of the wireless communication system, a message for coordinating spatial reuse based sharing of at least one resource by the AP and one or more further APs. Further, execution of the program code causes the wireless station to control, based on the received message, spatial reuse of the at least one resource by the wireless station.

According to a further embodiment, a computer program or computer program product is provided, e.g., in the form of a non-transitory storage medium, which comprises program code to be executed by at least one processor of an AP for a wireless communication system. Execution of the program code causes the AP to coordinate, with one or more further APs, spatial reuse based sharing of at least one resource. Further, execution of the program code causes the AP to determine whether a wireless station not participating in the coordinated spatial reuse based sharing of the at least one resource is allowed to transmit on the at least one resource and provide, to the wireless station, an indication that the wireless station is allowed to transmit on the at least one resource.

Details of such embodiments and further embodiments will be apparent from the following detailed description of embodiments.

DETAILED DESCRIPTION OF EMBODIMENTS

Figure 1:
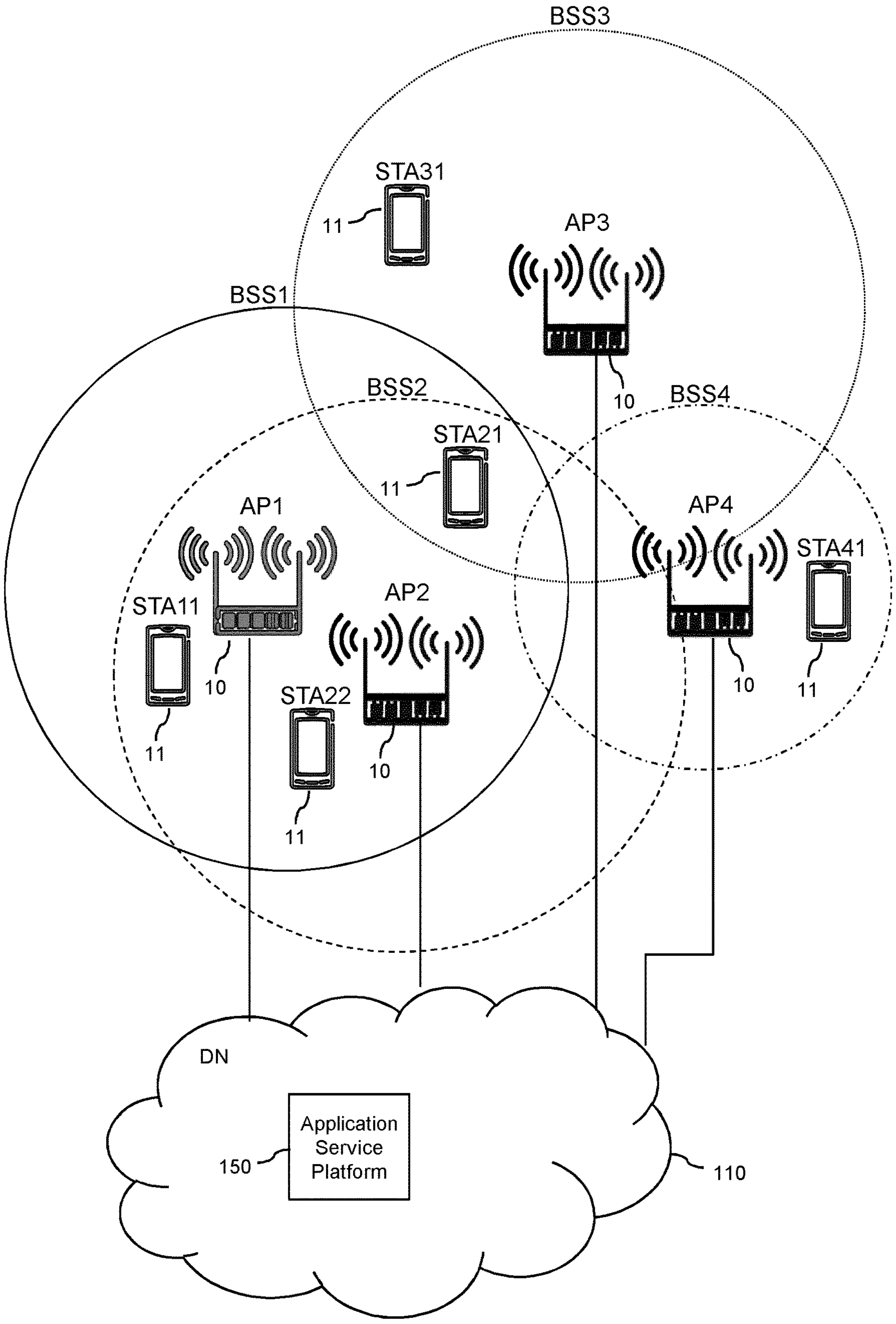
FIG. 1 schematically illustrates a wireless communication system according to an embodiment.

In the following, concepts in accordance with exemplary embodiments of the invention will be explained in more detail and with reference to the accompanying drawings. The illustrated embodiments relate to controlling of wireless transmissions in a wireless communication system. The wireless communication system may be a WLAN (Wireless Local Area Network) system based on a IEEE 802.11 technology. However, it is noted that the illustrated concepts could also be applied to other wireless communication technologies, e.g., to contention-based modes of the LTE (Long Term Evolution) or NR (New Radio) technology specified by 3GPP (3rd Generation Partnership Project).

The illustrated concepts involve that in CSR-based sharing of one or more resources, in the following also referred to as CSR resources, spatial reuse of the resource(s) is also enabled for a STA which is not participating in the CSR-based sharing. The CSR resources may for example be resources of a TXOP reserved by an AP of the wireless communication system. The STA not participating in the CSR based sharing may then autonomously control spatial reuse of the CSR resources, without requiring coordination by its associated AP. The STA could be associated to some other AP, which is not participating in the CSR-based sharing, e.g., because the AP to which the STA is associated decided not to react to an announcement of CSR-based sharing transmitting by a sharing AP. In some cases, the STA may receive the announcement of CSR-based sharing and, in response to the received announcement, autonomously control a spatial reuse based transmission on the CSR resources. In other cases, the sharing AP or shared AP may signal to the STA whether it is allowed to transmit on the CSR resources. In the latter case, the STA does not need to receive or be able to interpret the announcement of CSR-based sharing, so that a requirement of compatibility of the STA with the IEEE 802.11be amendment can be avoided.

The autonomously controlled spatial reuse of the resources may be based on spatial reuse mechanisms as specified in the IEEE 802.11ax technology, e.g., OBSS PD-based spatial reuse or PSR. However, other autonomously controlled spatial reuse mechanisms could be used as well. In the following, the autonomously controlled spatial reuse will also be referred to as ASR (Autonomous Spatial Reuse).

Accordingly, in the claimed concepts ASR is enabled for resources shared on the basis of CSR. The usage of ASR by a STA may be subject to certain conditions and limitations, so that adverse effects on the CSR-based sharing can be avoided. This may involve using CSR signaling to allow or disallow that STAs perform ASR. Further, this may involve defining conditions for allowing CSR to co-exist with STAs performing ASR. Still further, this may involve defining conditions when a STA can perform ASR on CSR resources both when it is associated with the shared AP and when it is not. As a result, overall system throughput can be increased and/or overall system latency be decreased.

FIG. 1 illustrates an exemplary wireless communication system according to an embodiment. In the illustrated example, the wireless communication system includes multiple access points (APs) 10, in the illustrated example referred to as AP1, AP2, AP3, AP4, and multiple stations (STAs) 11, in the illustrated example referred to as STA11, STA21, STA22, STA31, and STA41. The station STA11 is served by AP1 (in a first BSS denoted as BSS1), the stations STA21 and STA22 are served by AP2 (in a second BSS denoted as BSS2). The station STA31 is served by AP3 (in a third BSS denoted as BSS3). The station STA41 is served by AP4 (in a fourth BSS denoted as BSS4). The stations 11 may correspond to various kinds of wireless devices, for example user terminals, such as mobile or stationary computing devices like smartphones, laptop computers, desktop computers, tablet computers, gaming devices, or the like. Further, the stations 11 could for example correspond to other kinds of equipment like smart home devices, printers, multimedia devices, data storage devices, or the like.

In the example of FIG. 1, each of the stations 11 may connect through a radio link to one of the APs 10. For example depending on location or channel conditions experienced by a given station 11, the station 11 may select an appropriate AP 10 and BSS for establishing the radio link. The radio link may be based on one or more OFDM carriers from a frequency spectrum which is shared on the basis of a contention based mechanism, e.g., an unlicensed band like the 2.4 GHz ISM band, the 5 GHz band, the 6 GHz band, or the 60 GHz band.

Figure 4:
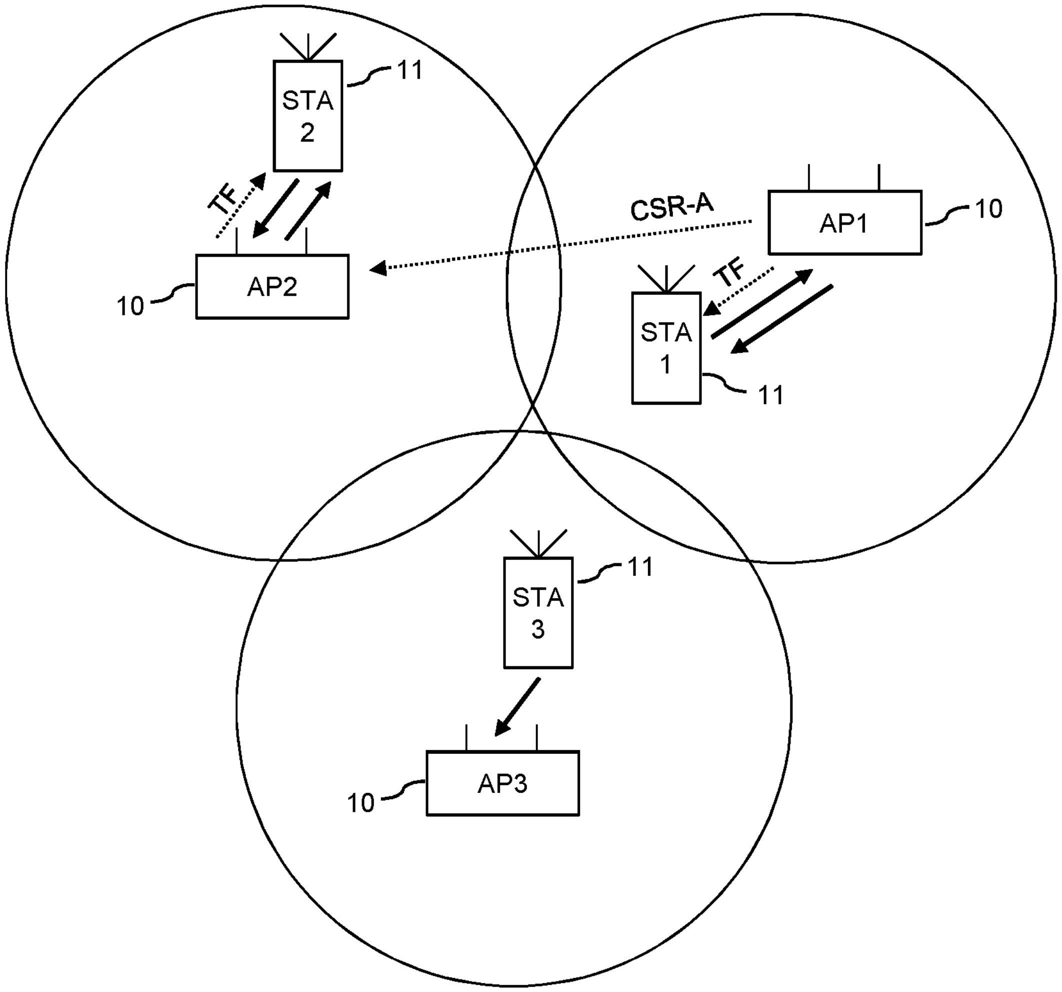
FIG. 4 schematically illustrates a further exemplary scenario involving spatial reuse according to an embodiment.

Each AP 10 may provide data connectivity of the stations 11 connected to the AP 10. As further illustrated, the APs 10 may be connected to a data network (DN) 110. In this way, the APs 10 may also provide data connectivity of stations 11 connected to different APs 10. Further, the APs 10 may also provide data connectivity of the stations 11 to other entities, e.g., to one or more servers, service providers, data sources, data sinks, user terminals, or the like. Accordingly, the radio link established between a given station 11 and its serving AP 10 may be used for providing various kinds of services to the station 11, e.g., a voice service, a multimedia service, or other data service. Such services may be based on applications which are executed on the station 11 and/or on a device linked to the station 11. By way of example, FIG. 4 illustrates an application service platform 150 provided in the DN 110. The application(s) executed on the station 11 and/or on one or more other devices linked to the station 11 may use the radio link for data communication with one or more other stations 11 and/or the application service platform 150, thereby enabling utilization of the corresponding service(s) at the station 11.

To achieve high performance in a scenario like illustrated in FIG. 1, coordination between the cells or BSSs may be utilized. For example, at least some of the involved APs 10 may contend for and share common resources. In particular, two or more of the APs 10 may contend for the same wireless medium or radio channel in order to obtain a TXOP. Then, the winning AP 10 can share the resources with the other contending APs in a dynamic fashion. For example, it can share the resources differently in different TXOPs. In the illustrated concepts, the sharing of the TXOP is assumed to utilize CSR-based sharing for at least some of the radio resources of the TXOP.

Figure 2:
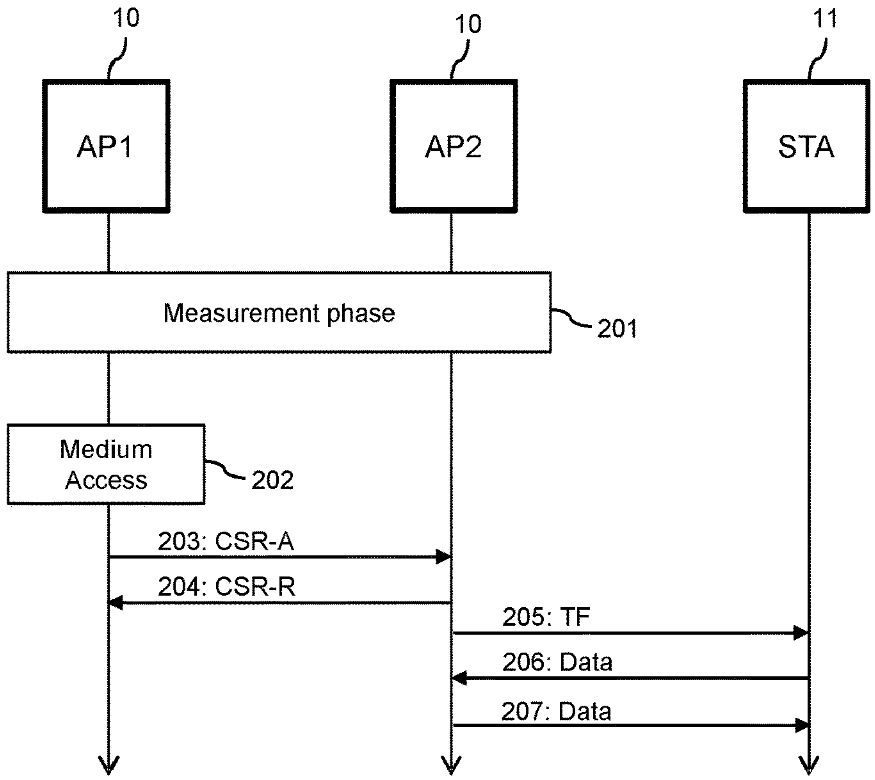
FIG. 2 schematically illustrates processes involving spatial reuse according to an embodiment.

FIG. 2 shows an example of processes which are based on the above concepts of CSR-based sharing of resources for random access transmissions. The processes of FIG. 2 involve a first AP 10, denoted as AP1, a second AP 10, denoted as AP2, and a STA 11. In the example of FIG. 2, it is assumed that the STA 11 is associated to AP2.

As indicated by block 201, a measurement phase may be used to assess path losses between APs 10 and STAs 11 which could potentially participate in the CSR-based sharing of resources. The measurement phase may involve that the STAs associated with AP1 and AP2 perform measurements with respect to surrounding APs and report the measurements to the associated AP. The measurements may be performed on the basis of measurement frames transmitted by AP1 and AP2. Further, the measurement phase may involve performing measurements between AP1 and AP2, in particular a measurement of the path loss between AP1 and AP2. Also these measurements between AP1 and AP2 may be based on measurement frames.

As indicated by block 202, the process of FIG. 2 involves that AP1 contends for the shared medium an wins a TXOP. AP1 then decides to share the TXOP with AP2, using CSR-based sharing for at least some resources of the TXOP. Sharing of the TXOP is coordinated by setup signaling between the sharing AP, i.e., AP1, and the shared AP, i.e., AP2. In the illustrated example, the setup signaling involves that AP1 sends a CSR announcement (CSR-A) message 203 to AP2. The CSR-A message 203 indicates to other APs that AP1 is willing to share the TXOP based on CSR. AP2 then responds by sending a CSR response (CSR-R) message 204 to AP1, indicating its intention to participate in sharing the TXOP. It is noted that the setup signaling may include further messages exchanged between AP1 and AP2. For example, AP1 may inform AP2 that it is allowed to participate in the sharing of the TXOP and also indicate a TXOP start time and resources of the TXOP which are allowed to be used by AP2. AP1 may inform AP2 about the level of allowed interference on the shared resources. It is also noted that such exchange of information in the setup signaling may be distributed in various ways to one or more messages. For example, information conveyed by the CSR-A message 203 could also be conveyed in multiple messages.

As further illustrated, AP2 sends a TF 205 to trigger UL transmissions by its associated STAs. The TF 205 may also indicate a power level to be used by the STA 11 when transmitting on the resources of the shared TXOP. In response to the TF 205, the STA 11 transmits data 206 to AP2, using resources of the shared TXOP and controlling the transmit power in accordance with the indication from AP2. Further, AP2 may also transmit data 207 to the STA 11, using resources of the shared TXOP and controlling the transmit power in accordance with the indication from AP1. Accordingly, the coordination between AP1 and AP2 in the setup signaling enables power control for UL transmissions from the STA 11 to AP2 and for DL transmissions from AP2 to STA 11, so that spatial reuse of the resources of the shared TXOP is possible.

In the illustrated concepts, CSR-based sharing of resources, like for example explained in connection with the processes of FIG. 2, may co-exist with ASR. That is to say, under certain conditions, one or more STAs may also perform ASR-based transmissions on the CSR resources. Accordingly, CSR and ASR should co-exist and cooperate without creating disruptive interference. For this purpose, the illustrated concepts also consider that, as compared to ASR, CSR relies on coordination among APs to improve performance. Since such coordination is absent in ASR, there is a risk that ASR causes interference at a level that has a negative impact on CSR-based transmissions. In some implementations described below, this issue is addressed by supplementing the CSR framework with a capability to indicate to a STA whether it is allowed to use ASR on CSR resources. In addition or as an alternative, the STA may deduce based on certain conditions whether it is allowed to use ASR on CSR resources.

Figure 3:
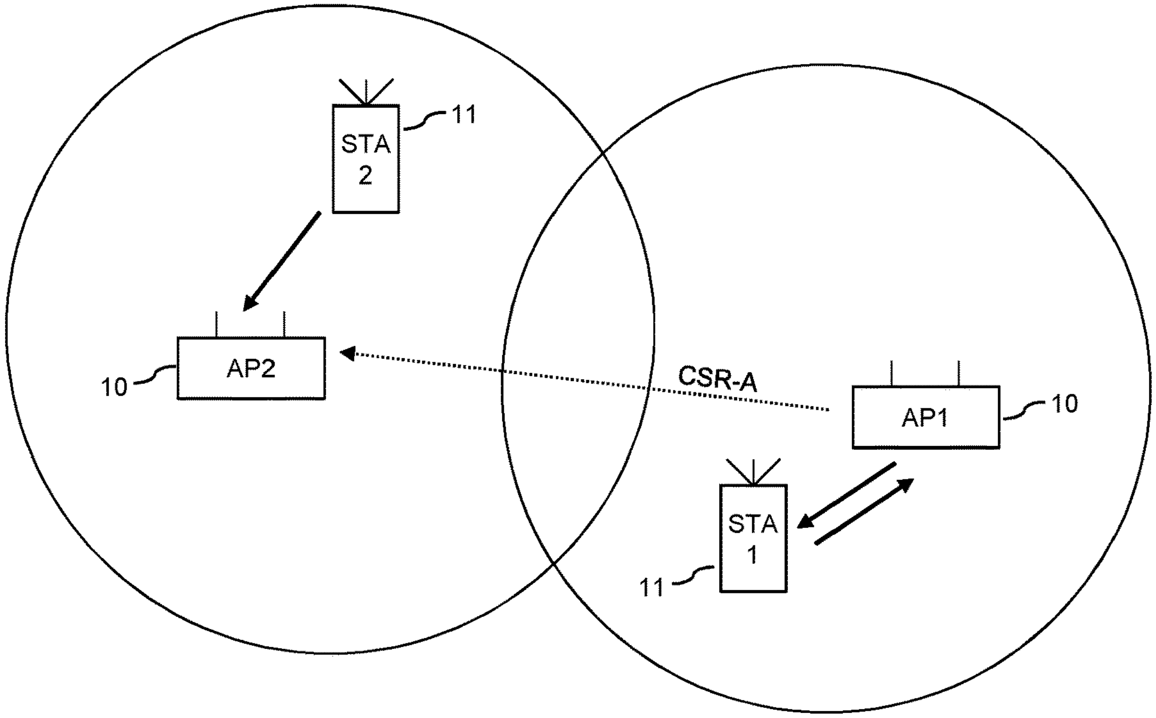
FIG. 3 schematically illustrates an exemplary scenario involving spatial reuse according to an embodiment.

In some scenarios, the CSR-A message may indicate whether a STA is allowed to use ASR on the CSR resources. FIG. 3 schematically illustrates an example of a corresponding scenario. The example of FIG. 3 involves a first AP 10, denoted as AP1, a second AP 10, denoted as AP2, a first STA 11 which is associated with AP1, denoted as STA1, and a second STA 11 which is associated with AP2, denoted as STA2. In the example of FIG. 3, AP1 is assumed to be the sharing AP, and AP2 is a potential shared AP.

In the example of FIG. 3, AP1 sends a CSR-A message to AP2, which however decides not to participate in the CSR. Nonetheless, the conditions may be favorable for STA2 to perform ASR on the CSR resources. Accordingly, STA2 may decide to perform ASR on the CSR resources based on detecting the CSR-A message from AP1 and identifying that the CSR-A message is directed to the AP to which STA2 is associated, i.e., to AP2. As an additional condition, STA2 may decide to perform ASR on the CSR resources in response to detecting that AP to which STA2 is associated, i.e., AP2, has not performed any transmissions. The latter may for example be indicative of AP2 having decided to not participate in the CSR and thus refrained from sending a CSR-R message. As a still further condition, a time period may be defined during which STA2 shall not attempt ASR-based transmissions and rather perform carrier sense on the CSR resources. This time period could for example be signaled in the CSR-A message. Only after expiry of the time period without sensing occupancy of the CSR resources, STA2 is allowed to perform an ASR-based transmission on the CSR resources.

Accordingly, a STA may perform an ASR-based transmission on CSR resources under the condition that: the STA receives a CSR-A message, determines that the CSR-A message is directed to its associated AP, and detects that there are no transmissions in its BSS. These conditions indicate that the AP to which the STA is associated did not utilize the CSR opportunity, but that the conditions are favorable for performing ASR on the CSR resources indicated by the CSR-A message. As an additional optionally condition, the STA may decide to perform ASR on the CSR resources only after performing carrier sense on the CSR resources for a certain time period without sensing occupancy of the CSR resources.

For controlling the transmit power of the STA when performing ASR-based transmissions on the CSR resources, the STA may utilize one or more parameters signaled in the CSR-A message, e.g., a tolerable interference level on the CSR resources.

In some scenarios, it may occur that the STA considering performing ASR based transmissions on CSR resources is not associated with a potential shared AP or a sharing AP. Fig. schematically illustrates an example of a corresponding scenario. The example of FIG. 4 involves a first AP 10, denoted as AP1, a second AP 10, denoted as AP2, a third AP 10, denoted as AP3, a first STA 11 which is associated with AP1, denoted as STA1, a second STA 11 which is associated with AP2, denoted as STA2, and a third STA 11 which is associated with AP3, denoted as STA3. In the example of FIG. 4, AP1 is assumed to be the sharing AP, and AP2 becomes a shared AP in response to AP1 sending a CSR-A message to AP2. AP3, however, does not participate in the CSR, e.g., because AP1 decided not to address the CSR-A message to AP3. However, under certain conditions, STA3 could still decide on perform ASR on the CSR resources. In such scenario, two cases may be distinguished: a) both the sharing AP and the shared AP, i.e., AP1 and AP2, perform CSR-based transmissions on the CSR resources, and b) only the sharing AP, i.e., AP1 is transmitting on the CSR resources.

The conditions under which the STA may decide to perform ASR on the CSR resources may include:

- The STA has detected a CSR-A message that is not directed towards its associated AP.
- The STA has not detected any transmissions in either the BSS of the shared AP, the BSS of the sharing AP, or both the BSS of the shared AP and the BSS of the sharing AP.
- The STA has performed carrier sense for a certain time to determine which of the above cases a) and b) applies.
- The STA has detected that the CSR-A message does not forbid ASR on the CSR resources.
- The STA has not detected a PPDU from another BSS that explicitly forbids the use of ASR.

From the CSR-A message, the STA may determine the sharing AP and the shared AP(s). If there are no transmissions in either the BSS of the shared AP or the BSS of the sharing AP, or both the BSS of the shared AP and the BSS of the sharing AP, this may indicate that the CSR opportunity is not utilized fully at either shared or sharing AP, or that interference is unlikely because the STA cannot detect any transmissions in the concerned BSSs. Accordingly, it is likely that the STA can perform ASR-based transmissions on the CSR resources without causing excessive interference.

As mentioned in connection with FIG. 3, for controlling the transmit power of the STA when performing ASR-based transmissions on the CSR resources, the STA may utilize one or more parameters signaled in the CSR-A message, e.g., a tolerable interference level on the CSR resources. If only a maximum allowable interference of the sharing AP is signaled in the CSR-A message, the STA may applies this maximum allowable interference of the sharing AP in order to determine its transmit power.

In some scenarios, the STA may read the TF sent from the shared AP, in the example of FIG. 4 AP2, to gain knowledge of the transmit power the shared AP asks its associated STA(s) to use when performing CSR-based transmissions on the CSR resources. The STA may then ensure that it performs the ASR-based transmissions on the CSR resources with lower transmit power, thereby also ensuring that the interference requirement of the sharing AP is fulfilled. In addition, a condition could be defined that the STA not being allowed to transmit on the CSR resources if the pathloss to the sharing $AP_{[MS1][ER2]}$ is less than a configured threshold.

In some scenarios, the illustrated concepts may be implemented without requiring that the STA performing ASR can interpret the CSR-A message. This allows for enabling ASR on CSR resources in a backwards compatible manner, e.g., by a STA without support of the IEEE 802.11be Amendment or by a STA that has not implemented the required functionalities for CSR. This may be achieved by the sharing AP and/or the shared AP transmitting signaling indicating whether ASR is allowed or disallowed. For this purpose, the sharing AP can configure the setting of one or more specific fields in CSR transmissions performed in the shared AP's BSS. Such fields may for example include one or more fields in a MAC header, in a U-SIG (Extremely High Throughput Universal Signal), or in a TF. The configuration of the field(s) can be accomplished by signaling the specific fields and the values of the fields in the CSR-A message. Such configuration could also provide the sharing AP with enhanced flexibility to control how CSR-based transmissions are performed in the shared APs BSS. In some scenarios, the fields which are controlled by the sharing AP could also be pre-configured, e.g., based on standardization, so that the signaling from the sharing AP does not need to indicate the field to be set, but only the value of the field. The fields controlled by the sharing AP may in particular include fields denoted as "PSR_DISALLOW" or "PSR_AND_NON_SRG_OBSS_PD_PROHIBITED", which are specified for controlling PSR and OBSS PD-based spatial reuse in the IEEE 802.11ax technology. Further, the sharing AP may also control the setting of the above-mentioned fields for CSR transmissions performed in the sharing AP's BSS. If another STA which does not participate in the CSR receives one of the CSR transmissions in the shared AP's BSS or in the sharing AP's BSS, it can read the field(s) and is thus informed whether it is allowed to use ASR in the CSR opportunity.

In some scenarios, the sharing AP may monitor interference on the CSR resources. Based on the monitored interference, the sharing AP may then decide whether a STA which does not participate in the CSR shall be allowed to use ASR in the CSR opportunity.

Figure 5:
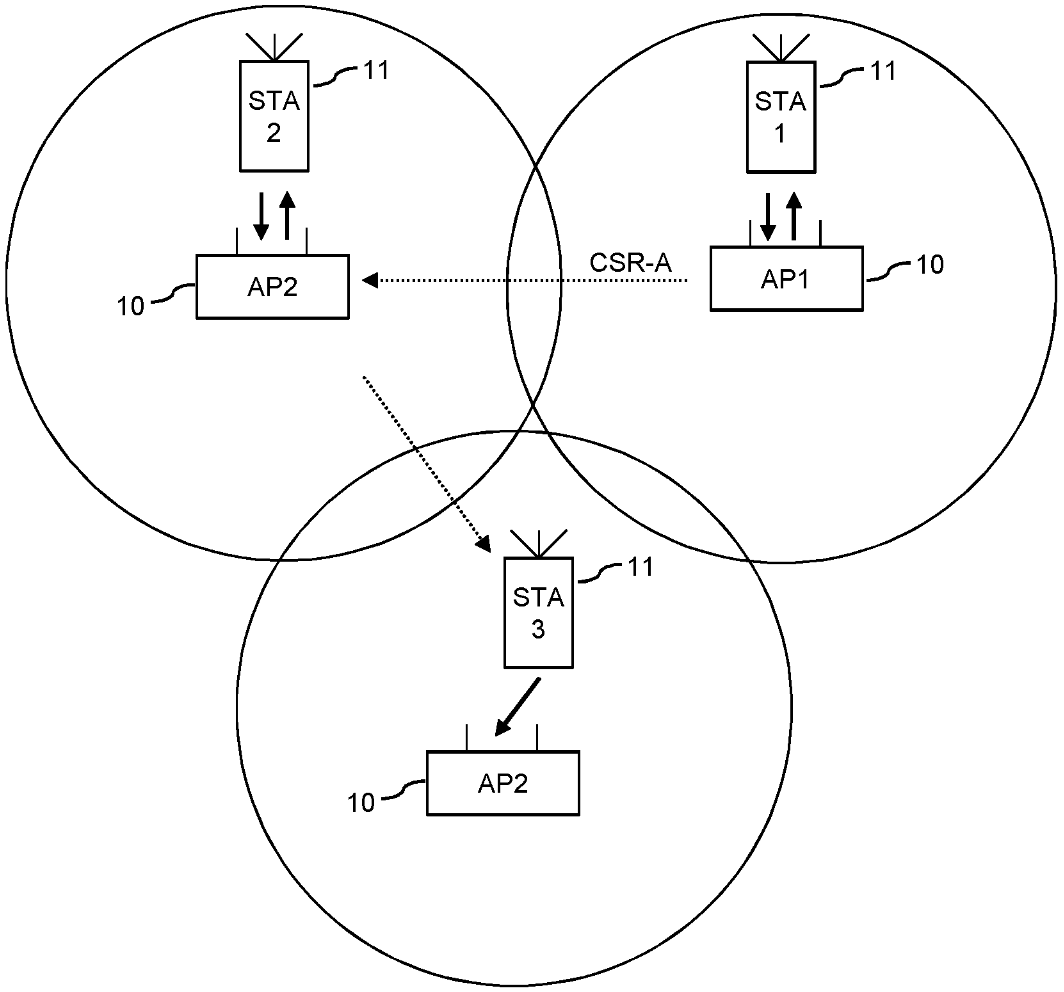
FIG. 5 schematically illustrates a further exemplary scenario involving spatial reuse according to an embodiment.

FIG. 5 illustrates an example of a scenario where signaling by the sharing AP and/or the shared AP is used to indicate to a STA not participating in the CSR whether ASR is allowed or disallowed. The example of FIG. 5 involves a first AP 10, denoted as AP1, a second AP 10, denoted as AP2, a third AP 10, denoted as AP3, a first STA 11 which is associated with AP1, denoted as STA1, a second STA 11 which is associated with AP2, denoted as STA2, and a third STA 11 which is associated with AP3, denoted as STA3. In the example of FIG. 5, AP1 is assumed to be the sharing AP, and AP2 becomes a shared AP in response to AP1 sending a CSR-A message to AP2. AP3, however, does not participate in the CSR, e.g., because AP1 decided not to address the CSR-A message to AP3. The CSR-A message configures the shared AP to set one or more fields of CRS transmissions in its BSS to indicate that ASR is allowed, e.g., by setting the PSR_DISALLOW field to "false". Further, the sharing AP also controls CRS transmissions in its own BSS to set one or more fields to indicate that ASR is allowed, e.g., by setting the PSR_DISALLOW field to "false". Upon receiving one of the CSR transmissions in the BSS of AP1 or in the BSS of AP2, STA3 can read the field(s) and thus deduce that it is allowed to use ASR on the same resources.

In a scenario as explained in connection with FIG. 5, the STA not participating in CSR can perform SRG (Spatial Reuse Group) OBSS PD-based spatial reuse if the STA detects one or more SRGs. These can for example be determined by reading a BSS color field in the PHY header. The SRG OBSS PD-based Spatial Reuse can be utilized within the CSR framework, if the STA not participating in CSR is part of the SRG and reads the BSS color field. The wireless communication system may set up SRGs with the BSSs that can participate in the spatial reuse transmissions if they are either directly participating in the CSR transmissions or participating indirectly through one or more associated STAs performing ASR. Accordingly, the APs may set up SRGs to enable ASR during a CSR opportunity. These SRGs can be different from the SRGs normally used for conventional ASR. This can be useful if ASR is also used independently of CSR. In some scenarios, the BSS color used for ASR in connection with CSR may be different, e.g., BSS color=0, depending on whether the sharing AP allows STAs not participating in the CSR to participate with ASR. In this way, it may be possible that the wireless communication system decides not to allow ASR in case a specific STA is causing issues or to disallow certain BSSs from using ASR. Accordingly, usage of ASR during a CSR opportunity may be controlled with finer granularity, on the level of individual BSS or of an individual STA.

In the case of PSR, the sharing APs may signal the PSR threshold to be used in the shared APs TFs, which are in turn used by the STA not participating in the CSR to control usage of the PSR during the CSR opportunity. For example, the sharing AP can signal the PSR threshold in the CSR-A message to the shared AP. In this way, the STA using PSR during the CSR opportunity can be controlled to apply a lower PSR threshold than other STAs. For example, the sharing AP could decide that both the sharing AP and the shared AP should utilize the same PSR threshold. Alternatively, the sharing AP could control the shared AP to utilize a smaller PSR threshold so that interference can be reduced. Accordingly, the sharing AP can flexibly control how PSR is applied by a STA which detects a transmission in the BSS of the shared AP.

Figure 6:
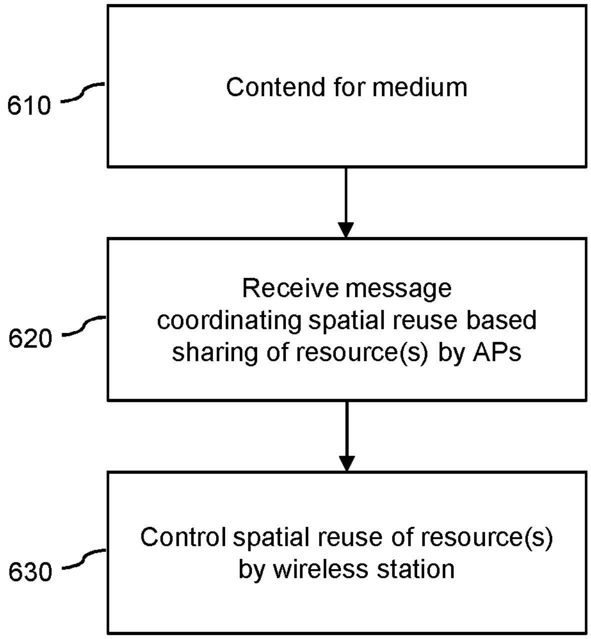
FIG. 6 shows a flowchart for schematically illustrating a method according to an embodiment.

FIG. 6 shows a flowchart for illustrating a method, which may be utilized for implementing the illustrated concepts. The method of FIG. 6 may be used for implementing the illustrated concepts in a wireless station for a wireless communication system. The wireless communication system may be based on a wireless local area network, WLAN, technology, e.g., according to the IEEE 802.11 standards family. The wireless station may for example correspond to any of the above-mentioned STAs 11, e.g., to STA2 in the example of FIG. 3, or to STA3 in the examples of FIG. 4 or 5.

If a processor-based implementation of the wireless station is used, at least some of the steps of the method of FIG. 6 may be performed and/or controlled by one or more processors of the wireless station. Such wireless station may also include a memory storing program code for implementing at least some of the below described functionalities or steps of the method of FIG. 6.

At step 610, the wireless station may contend for access to a medium. This may involve performing a CCA (Clear Channel Assessment) or LBT (Listen Before Talk) procedure to assess whether the medium is occupied. The CCA or LBT procedure may be based on a contention window which is extended with each unsuccessful access attempt. In some scenarios, the wireless station may win the contention for access to the medium. In other scenarios, some other device may win the contention for access to the medium. Such other device may in particular be an AP.

At step 620, the wireless station receives, from an AP of the wireless communication system, a message for coordinating spatial reuse based sharing of at least one resource by the AP and one or more further APs. The AP may be an AP which, at step 610, has won the contention for access to the medium. As regards the above-described CSR framework, the AP thus corresponds to a sharing AP and the one or more further APs correspond to shared APs. The message received from the access point comprises an announcement of coordinated spatial reuse of the at least one resource, such as the above-mentioned CSR-A message.

In some scenarios, the wireless station is not associated with any of the AP and the one or more further APs. For example, the wireless station could be associated with some other AP which is not participating in the spatial reuse coordinated by the message. In other cases, the wireless station could be associated with one of the one or more further APs.

At step 630, the wireless station controls spatial reuse of the at least one resource by the wireless station. This is accomplished based on the message received at step 620. The control of the spatial reuse at step 630 may involve controlling a transmit power of a wireless transmission performed by the wireless station on the at least one resource. In addition or as an alternative, the control of the spatial reuse at step 630 may involve determining whether the wireless station is allowed to transmit on the at least one resource. In response to determining that at least one of the one or more further APs is not transmitting on the at least one resource, the wireless station may determine that it is allowed to transmit on the at least one resource. Further, in response to determining that the wireless station is associated to one of the one or more further APs, the wireless station may determine that it is allowed to transmit on the at least one resource. In some cases, the determination whether the wireless station is allowed to transmit on the at least one resource may depend on a configuration of an AP to which the wireless station is associated. In particular, the AP may indicate to its associated wireless stations whether the wireless stations are allowed to use ASR.

Figure 7:
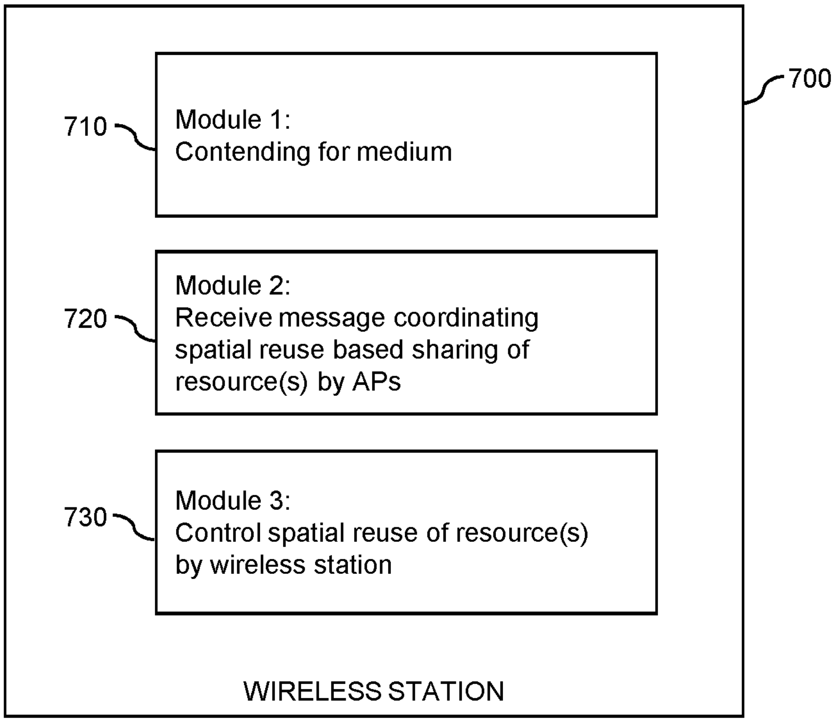
FIG. 7 shows a block diagram for schematically illustrating functionalities of a wireless station according to an embodiment.

FIG. 7 shows a block diagram for illustrating functionalities of a wireless station 700 which operates according to the method of FIG. 6. The wireless station 700 may for example correspond to one of above-mentioned STAs 11. As illustrated, the wireless station 700 may be provided with a module 710 configured to determine contend for a medium, such as explained in connection with step 610. Further, the wireless station 700 may be provided with a module 720 configured to receive a message for coordinating spatial reuse of at least one resource, such as explained in connection with step 620. Further, the wireless station 700 may be provided with a module 730 configured to control spatial reuse by the wireless station, such as explained in connection with step 630.

It is noted that the wireless station 700 may include further modules for implementing other functionalities, such as known functionalities of a WLAN STA. Further, it is noted that the modules of the wireless station 700 do not necessarily represent a hardware structure of the wireless station 700, but may also correspond to functional elements, e.g., implemented by hardware, software, or a combination thereof.

Figure 8:
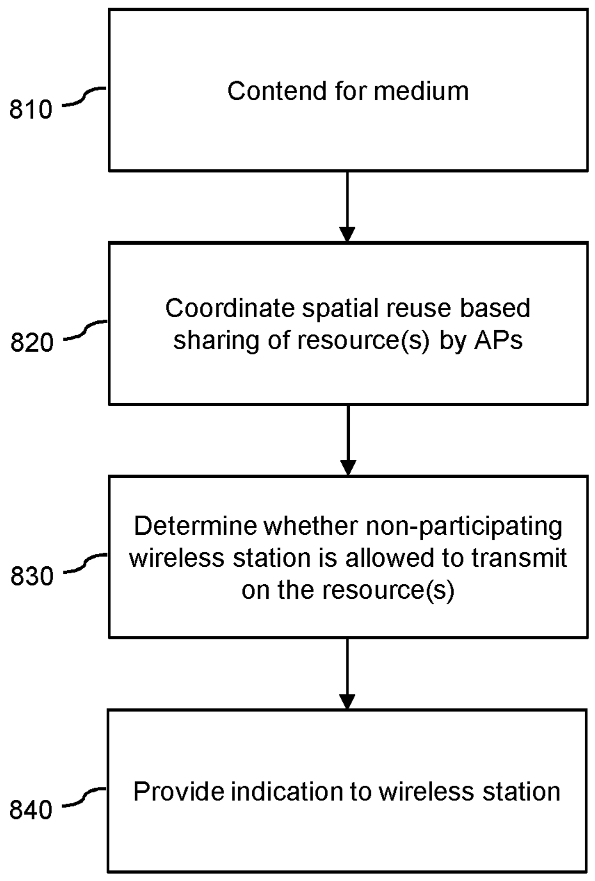
FIG. 8 shows a flowchart for schematically illustrating a method according to a further embodiment.

FIG. 8 shows a flowchart for illustrating a method, which may be utilized for implementing the illustrated concepts. The method of FIG. 8 may be used for implementing the illustrated concepts in an AP for a wireless communication system. The wireless communication system may be based on a wireless local area network, WLAN, technology, e.g., according to the IEEE 802.11 standards family. The AP may for example correspond to any of the above-mentioned APs 10.

If a processor-based implementation of the AP is used, at least some of the steps of the method of FIG. 8 may be performed and/or controlled by one or more processors of the AP. Such AP may also include a memory storing program code for implementing at least some of the below described functionalities or steps of the method of FIG. 8.

At step 810, the AP may contend for access to a medium. This may involve performing CCA or LBT procedure to assess whether the medium is occupied. The CCA or LBT procedure may be based on a contention window which is extended with each unsuccessful access attempt. In some scenarios, the AP may win the contention for access to the medium. In other scenarios, a further AP of the wireless communication system may win the contention for access to the medium. Such further AP may for example correspond to any of the above-mentioned APs.

At step 820, the AP coordinates spatial reuse based sharing of at least one resource with one or more further APs. In some scenarios, the wireless station is not associated with any of the AP and the one or more further APs. For example, the wireless station could be associated with some other AP which is not participating in the spatial reuse based sharing of the at least one resource.

In some cases, the AP may have won the contention for access to the medium at step 810 and may coordinate the spatial reuse by sending a message for announcement of the coordinated spatial reuse of the at least one resource to the one or more further APs. As regards the above-described CSR framework, the AP may then correspond to a sharing AP while the one or more further APs correspond to shared APs. In other cases, one of the one or more further APs may have won the contention for access to the medium at step 810. The AP may then coordinate the spatial reuse receiving a message for announcement of the coordinated spatial reuse of the at least one resource from this further AP. As regards the above-described CSR framework, the AP may then correspond to a shared AP while the one or more further APs include the sharing AP and optionally one or more further shared APs. The above-mentioned CSR-A message is an example of such message for announcement of the coordinated spatial reuse of the at least one resource.

At step 830, the AP determines whether a wireless station not participating in the coordinated spatial reuse based sharing of the at least one resource is allowed to transmit on the at least one resource, e.g., using ASR.

In some scenarios, the AP may monitor interference on the at least one resource and the determination whether the wireless station not participating in the coordinated spatial reuse based sharing of at least one resource is allowed to transmit on the at least one resource is based on the monitored interference on the at least one resource.

At step 840, the AP provides, to the wireless station, an indication that the wireless station is allowed to transmit on the at least one resource. In some scenarios, the AP may provide the indication by controlling at least one field of one or more wireless transmissions to be sent on the at least one resource based on the coordinated spatial reuse of the at least one resource. The at least one field may include at least one field of a MAC header, at least one field of an a U-SIG, and/or at least one field of a TF used in the coordinated spatial reuse of the at least one resource.

If at step 820 the AP sends a message for announcement of the coordinated spatial reuse of the at least one resource to the one or more further APs, the AP may controls the at least one header field by the message for announcement of the coordinated spatial reuse of the at least one resource. If at step 820 the AP receives a message for announcement of the coordinated spatial reuse of the at least one resource from one of the one or more further APs, the AP may controls the at least one header field based on the message for announcement of the coordinated spatial reuse of the at least one resource.

In some scenarios, the indication provided at step 840 further indicates at least one threshold for controlling spatial reuse of the at least one resource by the wireless station. The at least one threshold may for example include a PSR threshold. In some scenarios, the indication provided at step 840 indicates whether spatial reuse of the at least one resource is allowed, e.g., whether PSR or OBSS PD-based spatial reuse of the at least one resource is allowed.

Figure 9:
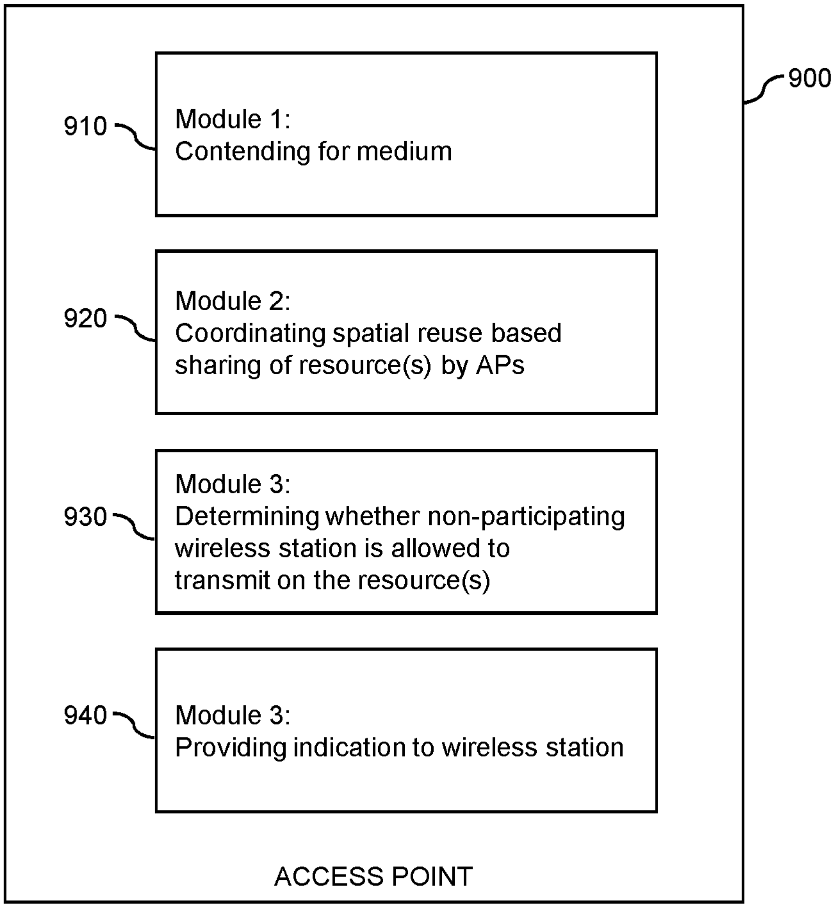
FIG. 9 shows a block diagram for schematically illustrating functionalities of an AP according to an embodiment.

FIG. 9 shows a block diagram for illustrating functionalities of an AP 900 which operates according to the method of FIG. 8. The AP 900 may for example correspond to one of above-mentioned APs 10. As illustrated, the AP 900 may be provided with a module 910 configured to contend for a medium, such as explained in connection with step 810. Further, the AP 900 may be provided with a module 920 configured to coordinate spatial reuse based sharing of at least one resource, such as explained in connection with step 820. Further, the AP 900 may be provided with a module 930 configured to determine whether a wireless station not participating in the coordinated spatial reuse is allowed to transmit on the at least one resource, such as explained in connection with step 630. Further, the AP 900 may be provided with a module 940 configured to provide an indication to the wireless station, such as explained in connection with step 840.

It is noted that the AP 900 may include further modules for implementing other functionalities, such as known functionalities of a WLAN AP. Further, it is noted that the modules of the AP 900 do not necessarily represent a hardware structure of the AP 900, but may also correspond to functional elements, e.g., implemented by hardware, software, or a combination thereof.

It is noted that the functionalities as described in connection with FIGS. 6 to 9 could also be implemented in a system, e.g., a system including an AP operating according to the method of FIG. 8 and one or more wireless stations operating according to the method of FIG. 6.

Figure 10:
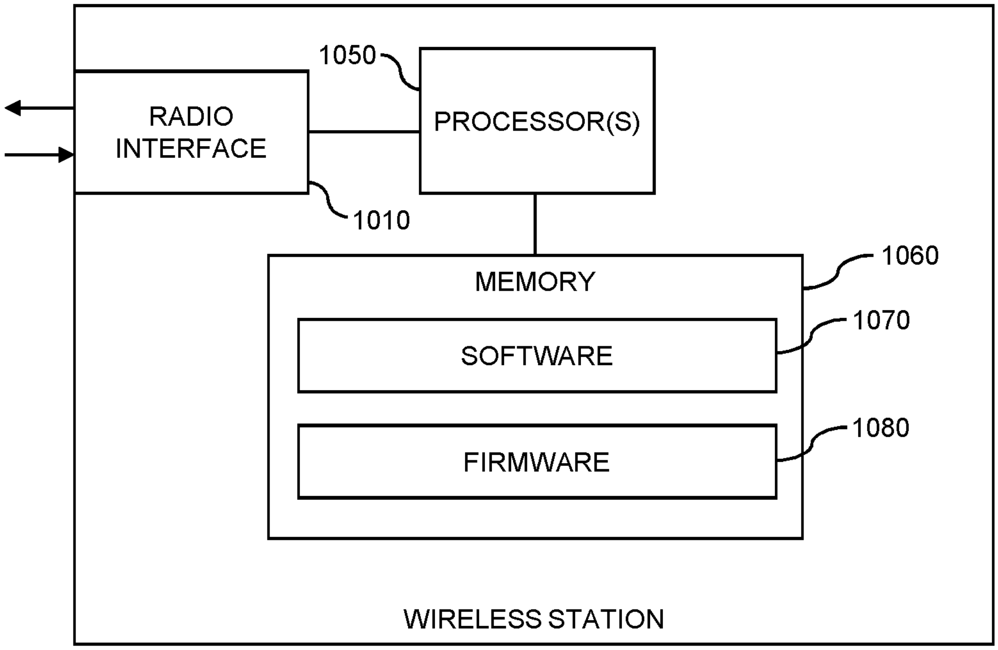
FIG. 10 schematically illustrates structures of a wireless station according to an embodiment.

FIG. 10 illustrates a processor-based implementation of a wireless station 1000 which may be used for implementing the above-described concepts. For example, the structures as illustrated in FIG. 10 may be used for implementing the concepts in any of the above-mentioned STAs 11.

As illustrated, the wireless station 1000 includes one or more radio interfaces 1010. The radio interface(s) 1010 may for example be based on a WLAN technology, e.g., according to an IEEE 802.11 family standard. However, other wireless technologies could be supported as well, e.g., the LTE technology or the NR technology.

Further, the wireless station 1000 may include one or more processors 1050 coupled to the radio interface(s) 1010 and a memory 1060 coupled to the processor(s) 1050. By way of example, the radio interface(s) 1010, the processor(s) 1050, and the memory 1060 could be coupled by one or more internal bus systems of the wireless station 1000. The memory 1060 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1060 may include software 1070 and/or firmware 1080. The memory 1060 may include suitably configured program code to be executed by the processor(s) 1050 so as to implement the above-described functionalities for controlling spatial reuse, such as explained in connection with FIG. 6.

It is to be understood that the structures as illustrated in FIG. 10 are merely schematic and that the wireless station 1000 may actually include further components which, for the sake of clarity, have not been illustrated, e.g., further interfaces or further processors. Also, it is to be understood that the memory 1060 may include further program code for implementing known functionalities of a WLAN STA. According to some embodiments, also a computer program may be provided for implementing functionalities of the wireless station 1000, e.g., in the form of a physical medium storing the program code and/or other data to be stored in the memory 1060 or by making the program code available for download or by streaming.

Figure 11:
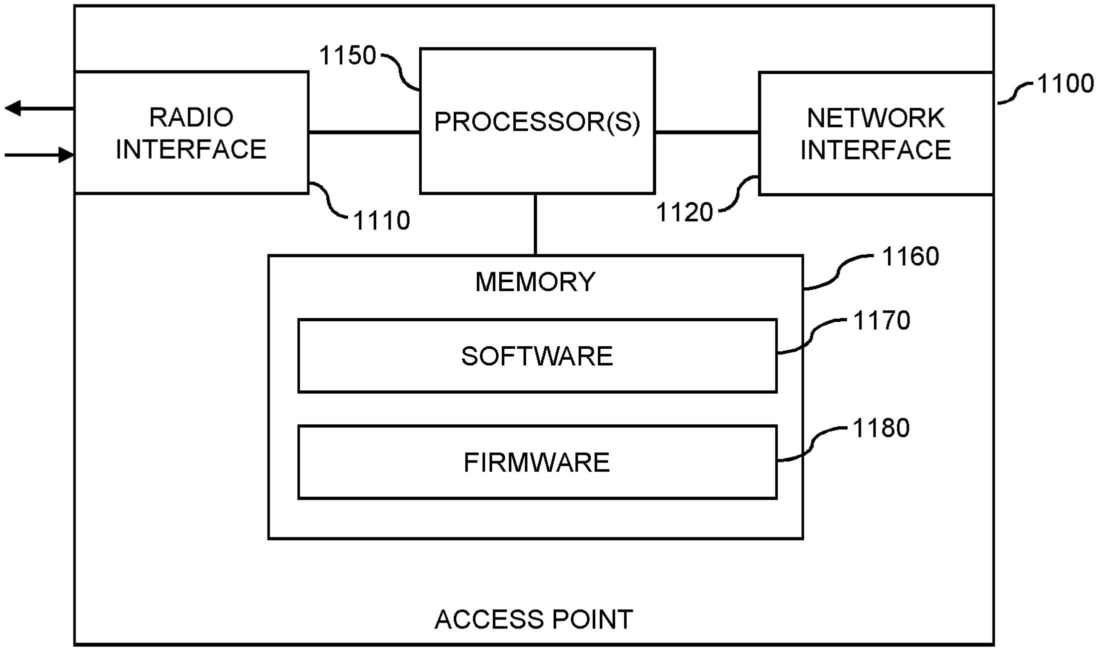
FIG. 11 schematically illustrates structures of an AP according to an embodiment.

FIG. 11 illustrates a processor-based implementation of an AP 1100 which may be used for implementing the above-described concepts. For example, the structures as illustrated in FIG. 11 may be used for implementing the concepts in any of the above-mentioned APs 10.

As illustrated, the AP 1100 includes one or more radio interfaces 1110. The radio interface(s) 1110 may for example be based on a WLAN technology, e.g., according to an IEEE 802.11 family standard. However, other wireless technologies could be supported as well, e.g., the LTE technology or the NR technology. As further illustrated, the AP 1100 may also include one or more network interfaces 1120 which may be used for communication with other nodes of a wireless communication network, e.g., with other APs or with an application service platform as illustrated in FIG. 1.

Further, the AP 1100 may include one or more processors 1150 coupled to the interface(s) 1110, 1120 and a memory 1160 coupled to the processor(s) 1150. By way of example, the interface(s) 1110, 1120, the processor(s) 1150, and the memory 1160 could be coupled by one or more internal bus systems of the AP 1100. The memory 1160 may include a ROM, e.g., a flash ROM, a RAM, e.g., a DRAM or SRAM, a mass storage, e.g., a hard disk or solid state disk, or the like. As illustrated, the memory 1160 may include software 1170 and/or firmware 1180. The memory 1160 may include suitably configured program code to be executed by the processor(s) 1150 so as to implement the above-described functionalities for controlling spatial reuse, such as explained in connection with FIG. 8.

It is to be understood that the structures as illustrated in FIG. 11 are merely schematic and that the AP 1100 may actually include further components which, for the sake of clarity, have not been illustrated, e.g., further interfaces or further processors. Also, it is to be understood that the memory 1160 may include further program code for implementing known functionalities of a WLAN AP. According to some embodiments, also a computer program may be provided for implementing functionalities of the AP 1100, e.g., in the form of a physical medium storing the program code and/or other data to be stored in the memory 1160 or by making the program code available for download or by streaming.

As can be seen, the concepts as described above may be used for efficient utilization of spatial reuse for transmission of random access transmissions on shared resources. For example, the concepts may enable efficient co-existence and cooperation of CSR and ASR, thereby allowing to improve throughput and/or to reduce latency. Further, backwards compatibility may be provided for devices not supporting CSR but ASR.

It is to be understood that the examples and embodiments as explained above are merely illustrative and susceptible to various modifications. For example, the illustrated concepts may be applied in connection with various kinds of wireless technologies, without limitation to WLAN technologies. Further, the concepts may be applied with respect to various types of APs and STAs. Still further, the illustrated concepts may be extended to various numbers of APs cooperating based on CSR. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method of controlling wireless communication in a wireless communication system, the method comprising:

a wireless station receiving a message of signaling between an access point and one or more further access points of the wireless communication system for coordinating spatial reuse based sharing of at least one resource by the access point and the one or more further access points, wherein the wireless station is not associated with any of the access point and the one or more further access points; and based on the received message, the wireless station controlling spatial reuse of the at least one resource by the wireless station.

2. The method according to claim 1, wherein controlling the spatial reuse by the wireless station comprises controlling a transmit power of a wireless transmission performed by the wireless station on the at least one resource.

3. The method according to claim 1, wherein controlling the spatial reuse by the wireless station comprises determining whether the wireless station is allowed to transmit on the at least one resource.

4. The method according to claim 3, wherein, in response to determining that at least one of the one or more further access points is not transmitting on the at least one resource, the wireless station determines that it is allowed to transmit on the at least one resource.

5. The method according to claim 3, wherein determining whether the wireless station is allowed to transmit on the at least one resource depends on a configuration of an access point to which the wireless station is associated.

6. The method according to claim 1, wherein the message comprises an announcement of coordinated spatial reuse of the at least one resource.

7. The method according to claim 1, wherein the wireless communication system is based on a Wireless Local Area Network technology according to the IEEE 802.11 standards family.

8. A method of controlling wireless communication in a wireless communication system, the method comprising:

an access point of the wireless communication system coordinating, with one or more further access points, spatial reuse based sharing of at least one resource;

the access point determining whether a wireless station is allowed to transmit on the at least one resource, wherein the wireless station is not associated with any of the access point and the one or more further access points and is not participating in the coordinated spatial reuse based sharing of the at least one resource; and the access point providing, to the wireless station, an indication whether the wireless station is allowed to transmit on the at least one resource.

9. The method according to claim 8, wherein the access point provides the indication by controlling at least one field of one or more wireless transmissions to be sent on the at least one resource based on the coordinated spatial reuse of the at least one resource.

10. The method according to claim 9, wherein the at least one field comprises at least one field of a Medium Access Control (MAC) header, at least one field of an Extremely High Throughput Universal Signal (U-SIG), or at least one field of a trigger frame used in the coordinated spatial reuse of the at least one resource.

11. The method according to claim 8, wherein the indication further indicates at least one threshold for controlling spatial reuse of the at least one resource by the wireless station.

12. The method according to claim 8, wherein determining whether the wireless station is allowed to transmit on the at least one resource is based on the access point monitoring interference on the at least one resource.

13. A wireless station configured for operation in a wireless communication system, the wireless station comprising:

at least one processor; and a memory containing program code executable by the at least one processor, whereby execution of the program code by the at least one processor causes the wireless station to:

receive a message of signaling between an access point and one or more further access points of the wireless communication system for coordinating spatial reuse based sharing of at least one resource by the access point and the one or more further access points, wherein the wireless station is not associated with any of the access point and the one or more further access points; and based on the received message, control spatial reuse of the at least one resource by the wireless station.

14. The wireless station according to claim 13, wherein execution of the program code by the at least one processor causes the wireless station to control the spatial reuse by the wireless station by controlling a transmit power of a wireless transmission performed by the wireless station on the at least one resource.

15. The wireless station according to claim 13, wherein control of the spatial reuse of the at least one resource by the wireless station includes the wireless station determining whether the wireless station is allowed to transmit on the at least one resource.

16. The wireless station according to claim 13, wherein execution of the program code by the at least one processor causes the wireless station to determine that the wireless station is allowed to transmit on the at least one resource by determining that at least one of the one or more further access points is not transmitting on the at least one resource.

17. An access point for a wireless communication system, the access point being configured to:

at least one processor; and a memory containing program code executable by the at least one processor, whereby execution of the program code by the at least one processor causes the access point to:

coordinate, with one or more further access points, spatial reuse based sharing of at least one resource;

determine whether a wireless station, which is not associated with any of the access point and the one or more further access points and not participating in the coordinated spatial reuse based sharing of the at least one resource, is allowed to transmit on the at least one resource; and provide, to the wireless station, an indication of whether the wireless station is allowed to transmit on the at least one resource.

18. The access point according to claim 17, wherein the access point is configured to provide the indication by controlling at least one field of one or more wireless transmissions to be sent on the at least one resource based on the coordinated spatial reuse of the at least one resource.

19. The access point according to claim 17, wherein the indication further indicates at least one threshold for controlling spatial reuse of the at least one resource by the wireless station.

20. The access point according to claim 17, wherein the access point is configured to determine whether the wireless station is allowed to transmit on the at least one resource based on the access point monitoring interference on the at least one resource.

* * * * *